United States Patent Office 3,850,851
Patented Nov. 26, 1974

3,850,851
PROCESS FOR THE PRODUCTION OF A CATALYST FOR OXIDATION OF AMMONIA
Edgar Koberstein, Alzenau, and Klaus-Peter Muller, Grossauheim, Germany, assignors to Deutsche Gold- und Silber-Scheideanstalt vormals Roessler, Frankfurt, Germany
No Drawing. Filed Aug. 21, 1972, Ser. No. 282,044
Claims priority, application Germany, Aug. 27, 1971, P 21 42 897.7
Int. Cl. B01j 11/22
U.S. Cl. 252—474         16 Claims

ABSTRACT OF THE DISCLOSURE

Catalysts suitable for the oxidation of ammonia to nitrogen oxides which are suitable to produce nitric acid are prepared by doping cobalt oxide, preferably $Co_3O_4$ with 0.1–10 atom percent, preferably 0.5–3 atom percent of lithium. In a given case, there is added a mold assist agent to form tablets, spheres, extruded pressed strands or honeycombs. The product is calcined in air or an oxygen stream at 300–700° C., preferably 400–600° C. and subsequently tempered at 700–900° C. in a reactive gas mixture of air and 8–10 vol. percent ammonia to increase the form stability.

---

The invention concerns a process for the production of a catalyst suitable to oxidize ammonia to nitrogen oxides which are used for the production of nitric acid. Among these nitrogen oxides are NO, $NO_2$ and $N_2O_3$.

It is known that cobalt and its compounds with oxygen can be used as catalysts for the oxidation of ammonia to the above mentioned oxides of nitrogen. It is also known that catalysts which contain cobalt or oxygen compounds of cobalt produce high yields at average to high loads in the oxidation of ammonia to the nitrogen oxides. Additives, especially oxides of aluminum or bismuth act as favorable promotors. However, it is also known that the favorable effect of promotors such as aluminum oxide, for example, leads to a reduction of the activity of the catalyst if the catalyst is employed for the oxidation of ammonia under pressure.

Doping of cobalt oxide catalysts with potassium ions has been considered as favorable for the activity of the catalyst in the above mentioned reaction by several authors. (N. P. Kurin, P. E. Bogdanov: Kataliz Vyssh. Shkole, Min. Vyssh. Sredn. Spets. Tr. 1-go Mezhruz. Sovesch po Katalizu 2 (1958), *I* page 215).

However, it has been established that potassium doped cobalt oxide catalysts in operation have a loss of about 70% of the original potassium content within a short time. As a result, the advantage of doping is correspondingly lost.

Pure cobalt oxide catalysts, however, until now, have not been usable industrially since they sinter very strongly. For these reasons, there is proposed in German Offenlegungsschrift 2,033,134 the use of carrier materials whereby, however, the yields obtainable and load carrying ability likewise are greatly lowered.

The invention relates to the surprising observation that cobalt oxide catalysts which have been doped with a lithium ion concentration lying in the usual concentration range of mineralizers applied in mineralogy after a short tempering time becomes stable in form, have practically no more sintering and therefore show an extraordinarily high catalytic activity and loadability in regard to the oxidation of ammonia to the above-mentioned nitrogen oxides. This type of catalyst consists of cobalt oxide, preferably $Co_3O_4$ which contains 0.1 to 10 atom percent of lithium, preferably 0.5 to 3 atom percent lithium and which by appropriate shaping, as, for example, by pressing is converted to form tablets, spheres or honeycomb bodies, for example, and whose shape stability is guaranteed by a suitable tempering program.

While $Co_3O_4$ is the preferred cobalt oxide, there can also be used CoO and $Co_2O_3$. Any convenient source of lithium can be used which can be converted to lithium oxide in the treatment. Thus there can be used lithium hydroxide, lithium oxide, lithium nitrite, lithium nitrate or lithium salts of organic acids. If lithium compounds other than lithium hydroxide are used, equimolar parts of aqueous ammonia must be added.

The invention accordingly is directed to a process which comprises doping a cobalt oxide, preferably $Co_3O_4$ with 0.1–10 atom percent, preferably 0.5–3 atom percent of lithium, thereupon, in a given case with the addition of a conventional mold assist agent such as graphite, other organic substances which can be burnt out, as for example, stearates, etc. in an amount of 0.1 to 3% by weight forming into tablets, spheres, extruded strands or honeycombs, then calcining at a temperature of 300–700° C., preferably 400–600° C. in air or an oxygen stream and finally tempering for form stabilization at 700–900° C. in a reactive gas mixture of air and 8–10 volume percent ammonia.

The calcining is best carried out for 1–5 hours, preferably 2–3 hours. Besides it has also proven suitable to carry out the tempering treatment for 10–120 minutes, perferably 30–90 minutes, most preferably for about 60 minutes.

According to a preferred form of the process of the invention, the doped cobalt oxide is ground before mixing with the mold assist agent. However, the doped cobalt oxide can be ground together with the mold assist agent.

The doping with lithium can be accomplished in different ways. Proceeding as follows has proven especially suitable: After mixing an aqueous solution of a cobalt salt, e.g. cobalt nitrate, cobaltous chloride, cobaltic chloride, cobalt acetate, or cobaltic bromide with an aqueous solution of lithium hydroxide, the precipitate obtained is separated off, for example, by filtering or centrifuging, suspended in an aqueous solution of an oxidizing agent, as, for example, hydrogen peroxide, or weak organic peroxy acids such as peroxy acetic acid, after oxidation the solid material is separated off, for example, by evaporation of the suspension and after drying and shaping is first calcined and then tempered.

The oxidation of the suspended solid can be carried out at room temperature. However, it is preferred to accelerate the reaction by heating of the solid suspension, e.g. at a temperature up to 100° C. The end-point of the oxidation is shown when the development of gaseous $O_2$ ceases. Generally to attain this a heating to boiling of 20–40 minutes is sufficient.

The new catalysts are thus produced by mixing an aqueous solution of a cobalt salt such as cobaltous nitrate with a solution that contains lithium hydroxide. The basic compound of divalent cobalt which contains the necessary lithium doping precipitates out. There is then separated off the precipitate from the remaining weakly alkaline aqueous solution, for example, by filtration or centrifuging and the solid material is suspended in an aqueous solution of an oxidizing agent such as hydrogen peroxide, for example, so that a reaction takes place between the solid material and the oxidizing agent. After the end of the reaction, the solid material is separated off again. This can be accomplished by evaporation of the suspension. The solid material is dried, mixed with graphite, pressed into suitably shaped bodies and these are calcined in the air or oxygen at a temperature of 300 to 700° C., preferably at 400 to 600° C. The molded article formed is finally tempered for ½ to 3 hours, preferably 1 hour, at a temperature of 700 to 900° C. in an atmosphere which besides air contains 8 to 10 volume percent of ammonia whereby the molded bodies slightly contract and acquire their final stable form. The molded bodies produced in this manner possess a hardness and stable form comparable to a ceramic product and a very high catalytic activity in regard to the above-mentioned oxidation reaction. Besides its ability to carry loads does not abate in long continued operation.

The invention also includes the catalysts prepared by the described procedures which contain cobalt oxides, preferably $Co_3O_4$ and 0.1–10 atom percent, preferably 0.5–3 atom percent of lithium with a structure imprinted by calcination in oxygen or air at 300–700° C., preferably 400–600° C. and by subsequent tempering in a mixture of air and 8–10 volume percent of ammonia at 700–900° C.

A characteristic catalyst according to the invention and prepared in Example 1 in X-ray powder analysis showed d-value (A.-units) and relative intensities (I) as follows:

| d(A.): | I |
|---|---|
| 4.70 | Middle. |
| 2.87 | Strong. |
| 2.464 | Weak. |
| 2.440 | Very strong. |
| 2.336 | Middle. |
| 2.132 | Do. |
| 2.089 | Weak. |
| 2.022 | Middle. |
| 1.853 | Very Weak. |
| 1.650 | Middle. |
| 1.555 | Strong. |
| 1.505 | Weak. |
| 1.427 | Strong. |
| 1.365 | Weak. |
| 1.276 | Do. |
| 1.232 | Middle. |

Finally the invention includes the use of the catalysts for the oxidation of ammonia to such nitrogen oxides which can be used to produce nitric acid. The reaction can take place at 750 to 950° C. using ammonia and air or oxygen. The ammonia can be 8 to 11% of the gas mixture by volume.

EXAMPLE 1

700 grams of cobalt nitrate (cobaltous nitrate) were dissolved in 5 liters of water. These solutions were added to 2 liters of a solution which contained 150 grams of lithium hydroxide so that there were formed a precipitate and a weakly alkaline solution. The precipitate was filtered off and suspended in 40 liters of 10% aqueous hydrogen peroxide solution. The suspension was heated to boiling and evaporated to dryness. The solid residue was ground, mixed with 3% by weight of graphite and molded into tablets. The finished tablets were calcined for 3 hours at 600° C. in an airstream and finally tempered for 1 hour at 800° C. in an atmosphere which contained in addition to air 8.3 volume percent of ammonia.

EXAMPLE 2

A catalyst produced according to Example 1 was inserted in a suitable reactor to a height of 6 cm., for example. The catalyst showed the following activities:

| Temperature (° C.) | Gas employed (vol. percent $NH_3$, balance air) | GHSV (h.$^{-1}$) | Transformation (percent) | Nitrogen oxide yield (percent) | Specific load (kg. $NH_3$/ m.$^3 \times$h.) |
|---|---|---|---|---|---|
| 785 | 10.0 | 50,000 | 99.9 | 98.7 | 3,500 |
| 800 | 8.7 | 100,000 | 99.8 | 98.0 | 6,200 |
| 820 | 9.5 | 135,000 | 98.8 | 96.5 | 9,100 |
| 830 | 8.3 | 200,000 | 96.6 | 95.0 | 11,800 |

EXAMPLE 3

A catalyst produced according to Example 1 was inserted in a suitable reactor to a height of 6 cm. and the transformation ascertained depending on the time at a GHSV (gas hourly space velocity) of 50,000 h.$^{-1}$ employing a gas containing 10% ammonia, balance air. The same process was repeated with a catalyst doped with potassium ions by a known process and of equal volume and equal height of change. A comparison of the results with both catalysts is shown in the following comparison:

| Temperature, ° C. | | Duration, hours | Transformation, percent | | Nitrogen oxide yield, percent | |
|---|---|---|---|---|---|---|
| Li plus doped | Plus K doped | | Li plus doped | K plus doped | Li plus doped | K plus doped |
| 780 | 780 | 1 | 99.9 | 99.7 | 99.8 | 90.3 |
| 780 | 810 | 3 | 99.9 | 99.9 | 98.5 | 95.1 |
| 810 | 820 | 8 | 99.9 | 99.8 | 98.7 | 87.8 |

EXAMPLE 4

Contraction, hardness (characterized by crushing strength), and alkali content of the catalyst produced by Example 1 were ascertained. For this purpose, the catalyst was operated at temperature of 780 to 830° C. at space velocities up to 200,000 h.$^{-1}$ operation was carried out with a mixture of 8 to 10 volume percent ammonia, balance air. The results were as follows:

| Time of operation (h.$^{-1}$) | Hardness (kg./cm.$^2$) | Contraction (percent) | Lithium content (atom percent) |
|---|---|---|---|
| 0 | | | 0.72 |
| 1 | | 0.0 | |
| 8 | | 0.0 | |
| 40 | 150–200 | 0.0 | 0.73 |

In an identical experiment with a catalyst produced by a known process which catalyst was doped with potassium, the potassium content in 5 hours was reduced from 0.3 to 0.04 atom percent while the contraction amounted to 33%.

The catalyst of the invention therefore is well suited for the preparation of the nitrogen oxides such as NO, $NO_2$ and $N_2O_3$ which are used to make nitric acid.

We claim:
1. A process for the production of a catalyst suitable for the oxidation of ammonia to oxides of nitrogen which are used for the production of nitric acid comprising forming cobalt oxide doped with 0.1–10 atom percent of lithium into shape, then calcining in air or oxygen at 300–700° C. and subsequently tempering at 700–900° C. in a reaction gas mixture of air and 8–10 volume percent of ammonia to stabilize the form.

2. A process according to Claim 1 wherein the cobalt oxide is $Co_3O_4$.

3. A process according to Claim 2 wherein the calcining is at 400–600° C. and there is present 0.5–3 atom percent of lithium.

4. A process according to Claim 3 wherein the calcining is for 2–3 hours.

5. A process according to Claim 4 wherein the tempering is at 30–90 minutes.

6. A process according to Claim 2 wherein the calcining is for 1–5 hours and the tempering is for 10–120 minutes.

7. A process according to Claim 1 wherein the doped cobalt oxide is ground and then mixed with a mold assist agent prior to the calcining.

8. A process according to Claim 7 wherein the doped cobalt oxide is ground with the mold assist agent.

9. A process according to Claim 2 including the steps of preparing the lithium doped cobalt oxide by mixing an aqueous solution of a cobalt salt and lithium hydroxide to form a precipitate, suspending the precipitate in an aqueous solution of an oxidizing agent and drying the suspension prior to calcining.

10. A process according to Claim 9 wherein the cobalt salt is cobalt nitrate.
11. A process according to Claim 10 wherein the oxidizing agent is hydrogen peroxide.
12. A catalyst produced according to Claim 1.
13. A catalyst according to Claim 12 containing 0.5–3 atom percent lithium.
14. A catalyst according to Claim 13 having the following X-ray analysis:

| d(A.): | I |
|---|---|
| 4.70 | Middle. |
| 2.87 | Strong. |
| 2.464 | Weak. |
| 2.440 | Very strong. |
| 2.336 | Middle. |
| 2.132 | Do. |
| 2.089 | Weak. |
| 0.022 | Middle. |
| 1.853 | Very weak. |
| 1.650 | Middle. |
| 1.555 | Strong. |
| 1.505 | Weak. |
| 1.427 | Strong. |
| 1.365 | Weak. |
| 1.276 | Do. |
| 1.232 | Middle. |

15. A catalyst suitable for the oxidation of ammonia to oxides of nitrogen which are used for the production of nitric acid comprising cobalt oxide doped with 0.1–10 atom percent of lithium.

16. A catalyst according to Claim 15 having the following X-ray analysis:

| d(A.): | I |
|---|---|
| 4.70 | Middle. |
| 2.87 | Strong. |
| 2.464 | Weak. |
| 2.440 | Very strong. |
| 2.336 | Middle. |
| 2.132 | Do. |
| 2.089 | Weak. |
| 2.022 | Middle. |
| 1.853 | Very weak. |
| 1.650 | Middle. |
| 1.555 | Strong. |
| 1.505 | Weak. |
| 1.427 | Strong. |
| 1.365 | Weak. |
| 1.276 | Do. |
| 1.232 | Middle. |

References Cited

UNITED STATES PATENTS

| 1,918,957 | 7/1933 | Bray | 252—474 |
| 2,211,208 | 8/1940 | Patteff et al | 252—477 R |
| 3,767,772 | 10/1973 | Geus et al. | 423—404 |

OTHER REFERENCES

Henderson, J. G.: *Metallurgical Dictionary*, N.Y., Reinhold, 1953, pp. 166–167.

DANIEL E. WYMAN, Primary Examiner

W. J. SHINE, Assistant Examiner

U.S. Cl. X.R.

423—404